United States Patent [19]

Müller et al.

[11] Patent Number: 4,667,755

[45] Date of Patent: May 26, 1987

[54] DRILL BIT HAVING HOLLOW CYLINDRICAL BODY AND A PLURALITY OF PCD CUTTING ELEMENTS

[75] Inventors: Norbert Müller, Wolperswende; Anton Scheuch, Ravensburg, both of Fed. Rep. of Germany

[73] Assignee: Hawera Probst GmbH & Co., Ravensburg, Fed. Rep. of Germany

[21] Appl. No.: 706,456

[22] Filed: Feb. 26, 1985

[30] Foreign Application Priority Data

Feb. 29, 1984 [DE] Fed. Rep. of Germany ....... 3407427

[51] Int. Cl.$^4$ ............................................. E21B 10/48
[52] U.S. Cl. .................................... 175/330; 175/410; 125/20; 51/206 R
[58] Field of Search ............... 175/329, 330, 332, 334, 175/403, 409, 410; 51/209 R, 206.4, 204; 125/20

[56] References Cited

U.S. PATENT DOCUMENTS

| 1,506,119 | 8/1924 | Hansen | 175/330 |
| 2,081,302 | 5/1937 | Jarvis | 175/330 |
| 2,996,061 | 8/1961 | Miller | 175/330 X |
| 3,176,675 | 4/1965 | Bomba | 51/206.4 X |
| 3,430,526 | 3/1969 | Valenziano | 125/20 X |
| 3,494,348 | 2/1970 | Lindblad | 51/209 R X |
| 3,763,601 | 10/1973 | Schwarzkopf et al. | 51/206.4 |
| 3,898,772 | 8/1975 | Sawluck | 51/209 R X |
| 4,056,152 | 11/1977 | Lacey | 175/403 X |
| 4,098,362 | 7/1978 | Bonnice | 175/329 |
| 4,208,154 | 6/1980 | Gundy | 175/330 X |

FOREIGN PATENT DOCUMENTS 277114 12/1969 Austria ................................. 175/330

OTHER PUBLICATIONS

Geoset* Drill Diamond "Application and Design Guidelines" Brochure Sept., 1981.

Primary Examiner—Stephen J. Novosad
Assistant Examiner—David J. Bagnell
Attorney, Agent, or Firm—Spencer & Frank

[57] ABSTRACT

A drill bit, having heavy-duty cutting elements, is proposed which is intended for rotary, air-cooled application. So that the drill bit can be operated with a relatively low thrust pressure, PCD cutting elements (14) are provided which only slightly overlap the thin-walled cylinder (11, 12) to produce an air gap for cooling and for conveying the drilling dust.

19 Claims, 2 Drawing Figures

DRILL BIT HAVING HOLLOW CYLINDRICAL BODY AND A PLURALITY OF PCD CUTTING ELEMENTS

BACKGROUND OF THE INVENTION

The invention is based on a drill bit for an air-cooled dry drilling method.

When drilling with drill bits, a distinction is made between purely rotary application, that is, drilling without vibration of the material to be drilled, and drilling with a percussive drilling tool, for example with a hammer drill. For the first-mentioned case, drill bits for working very hard rock are known, in which sintered diamond layers are arranged on the end face of the drill bit. These layers do not have any defined cutting edges but are permeated by a diamond granulation in a similar way as diamond grinding wheels. Material removal is therefore more of a grinding action than a cutting action. Moreover, drill bits having inserted carbide cutting elements have become known which remove material by percussive working, for example with a hammer drill.

The first-mentioned drill bit has the disadvantage that it can only be used with a stand, because of the low specific cutting force as a result of the large area, in order to achieve the requisite thrust force. This requires a high technical outlay on equipment and long setting-up times and therefore by and large involves high expenditure. The other drill bit mentioned, with carbide cutting elements, reaches its limits when working very hard rock, because carbide is substantially less hard than diamond.

With the known drill bits, a further disadvantage is that they are essentially operated with water cooling to cool the cutting area and remove the drilling dust. This also requires a high technical outlay on equipment and cannot easily be used in all applications.

Moreover, from the field of mining, especially coal mining, diamond tools have become known for drilling in the most diverse rock types and formations. For special application in soft to medium-hard formations such as salt, shale and anhydrite, etc., a drilling tool with PCD cutting elements (polycristalline, synthetic diamond coating) has become known which is fitted with annular cutting elements. The drilling conditions in mining are essentially quite different from conditions in building construction and civil engineering, so that no kind of ideas whatsoever can be gleaned here for the present invention.

SUMMARY OF THE INVENTION

The object of the invention is to improve a drill bit of the type described above to the effect that it can be used without auxiliary means such as drilling stands with low thrust force, preferably with the air-cooled drilling method. Moreover, the known disadvantages of the known drill bits described are to be avoided.

This object is achieved by the provision of a novel drill bit for rotary application by an air-cooled, dry drilling method, the bit comprising: a thin-walled cylinder having a cutting end face; at least two heavy-duty, PCD cutting elements fastened to the cylinder at the cutting end face, each cutting element comprising a carbide body and a synthetic polycrystalline diamond coating applied to the carbide body, wherein in the radial direction of the cylinder, each cutting element has a width of about 2.5 to 4 mm and the thin-walled cylinder has a wall thickness of about 50% of the width of each cutting element; and a plurality of guide elements secured to the cylinder and projecting axially from the cutting end face for limiting the drilling feed of the cutting elements, each guide element being located between successive ones of the cutting elements and having a radial outer diameter substantially equal to that of the cutting elements. Each cutting element preferably has a width of about 3 mm.

The drill bit according to the invention is especially suitable for use on constructional materials such as plaster board, aerated concrete, chip board, bricks, ceramic tiles, concrete, reinforced concrete and composite materials such as, for example, shuttering with wooden support structures. It is therefore equally suitable for electrical fitters, plumbers, locksmiths, etc.

The fact that a vibration-free operation, which is of advantage for example when drilling in the area of tiles, is possible by rotary application alone, that is, without percussive loading, must be considered a particular advantage of the invention.

The drill bit according to the invention is pushed in a torsionally-resistant manner onto a connecting flange and cooled by cooling air flowing laterally past the cylinder walls, with the drilling dust being drawn off into the inside of the connecting flange. In this way, a dry and dust-free method of operation is possible.

By the high specific cutting pressure according to the invention, caused by the special design of the PCD cutting elements, an output which is comparable or better than that of other systems can be achieved with only an average thrust force of 250 N max., that is without the addition of a stand. Moreover, diameter ranges of 15 to 100 mm can be worked.

In the case of the invention, the design of the PCD cutting elements as very narrow cutting elements is of considerable importance. However, according to the invention, the wall thickness of the cylinder tube must be about 50% less than the cutting width of the cutting elements, so that cooling air can be drawn in laterally at the outer wall, whereas the air, including the drilling dust, must be drawn off at the inner wall.

According to a further development of the invention the thin-walled cylinder has an outer radius, $r_2$, and an inner radius, $r_3$, the width of each cutting element extends between an outer radial distance, $r_1$, and an inner radial distance, $r_4$, from the axis of the cylinder, and each cutting element is radially positioned relative to the cylinder such that the area, $F_1$, of an annulus having an outer radius $r_1$ and an inner radius $r_2$ is less than the area, $F_2$, of an annulus having an outer radius $r_3$ and an inner radius $r_4$. Preferably, $r_3$ is at least 20 mm and $F_2$ is 25% larger than $F_1$. It is essential that the outer annular area formed during drilling between the rock and the cylinder jacket outer surface is smaller than or the same as the inner surface between the inner wall of the cylinder and rock core. At a diameter of the drill bit of 60 mm and larger, the area ratio can be 1:1. At smaller diameters, the inner cross-sectional area must be up to 25% greater to ensure both adequate air throughput and adequate removal of the drilling dust by the cooling air. To achieve long tool life, that is, to prevent tool wear, a particularly intensive cooling of the tool is necessary.

A further embodiment of the invention makes provision for the PCD cutting elements to work at a relief angle of 5° to 10°, preferably 12°, and at a negative rake angle of 5° to 20°, preferably 12°. Since particularly hard materials are to be worked with the tool according to the invention, a negative racke angle is selected which gives longer tool life and higher drilling output.

According to the invention, the guide pins and/or guide elements are provided to ensure adequate support of the drill bit relative to the inhomogenous material, for example with concrete. The guide pins are arranged preferably asymmetrically between the cutting elements to avoid chatter by torsional vibration. Moreover, it is the function of the guide pins or guide elements, by their axial arrangement to limit the drilling feed, that is, the effective cutting depth of the cutting elements. In this way, excessive wear is also prevented.

According to a further embodiment of the invention, it is advantageous to form the drill bit as a cylindrical bit body made of normal steel and to use a bit ring made of higher grade steel to keep down the overall material costs. The bit ring is a wear part which has to be exchanged after a certain time in operation. The bit body could be used again.

According to another embodiment it is advantageous for a clearance space in the form of a notch to be provided directly in front of the cutting edge of the PCD cutting element, which clearance space is used for removing the drilling dust developing at the cutting edge. In this way, the drilling dust cannot remain in the cutting area and cause additional wear.

According to an advantageous embodiment, deflecting surfaces are provided in front of the cutting surfaces, which deflecting surfaces are used to protect the cutting surfaces. In inhomogeneous concrete, the drill bit can develop axial vibration. To prevent excessive wear connected with this, the deflecting surfaces cause the drill cutting edges to engage constantly in the material to be drilled.

An advantageous further development of the invention makes provision for the outer corners of the PCD cutting elements to be bevelled or rounded. With pointed corners, the load on the corners is so large that they can break off in an uncontrolled manner, and a cutting surface will develop which does not meet the desired requirements.

According to another embodiment, the drill bit according to the invention can be pushed onto a connecting flange out of which pins project laterally into which the L-shaped slots engage. In this way, a quick-action catch is created for easy interchangeability of the drill bits.

According to a further embodiment, the cylinder wall can have helical grooves on the inside and the outside to make it easier to convey in particular the cooling air.

An advantageous and expedient illustrative embodiment of the invention is explained in greater detail in the following description and shown in the drawings, wherein:

DESCRIPTION OF THE PREFERRED EMBODIMENTS

Figure 1:
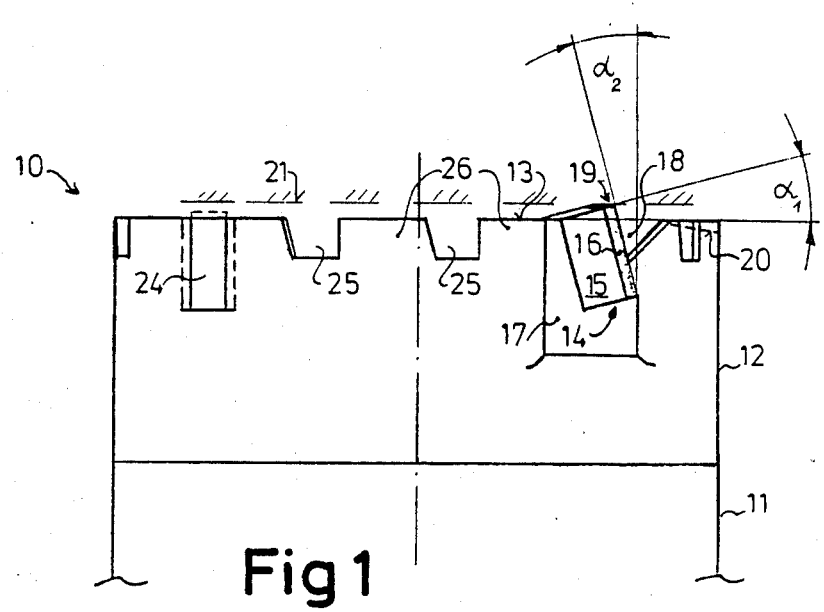
FIG. 1 shows a side view of the drill bit according to the invention.

The drill bit 10 shown in FIG. 1 consists of a cylindrical bit body 11 and a bit ring 12 brazed onto the cylindrical bit body 11.

According to the embodiment of the invention shown in FIG. 1, three PCD cutting elements 14 are arranged in an equilateral triangle on the end face 13 of the drill bit 10. At larger tool diameters, four to five PCD cutting elements are attached. The elements consist of a carbide parent body 15 to which a synthetic, polycristalline diamond coating 16 is applied. These PCD cutting elements are known by the trade names Syndite (De Beers), Compax, Stadapax (General Electric) and are on the market. Cutting elements are generally also called blanks.

According to the invention, these PCD cutting elements 14 are integrated into the tool, that is, into the bit ring, in such a way that the temperature-sensitive PCD cutting elements do not suffer any damage and air cooling in particular is adequate. To fix the PCD cutting elements 14, the bit ring 12, which is made of hardened steel, has locating pockets 17 into which the PCD cutting elements are brazed, or welded by electron beam welding. At an outside diameter of the drill bit of, for example, 65 mm, three PCD cutting elements 14 are used. At a cutting width of the PCD cutting elements of 3 mm, a thrust force of 50 to 150 N is required to achieve an adequate drilling feed. However, the maximum thrust force should not exceed 250 N in order to keep the specific cutting pressure within limits.

For operating the tool, it is of prime importance that it is only used in a rotary and not percussive action. When starting drilling, the tool is centered in a way known per se, with the centering pin being removed again after centering. The output of the rotary drilling machine or the percussive drilling machine with disengaged percussive mechanism should have a power input of at least 600 W.

According to the representation in FIG. 1, the PCD cutting element 14 is inserted into the bit ring 12 in such a way that there is a relief angle $\alpha_1$ and a negative rake angle $\alpha_2$ of about 12°. A clearance space 18 is provided directly in front of the cutting edge, wherein the clearance space 18 is produced by bevelling the wall by $\alpha_3 \approx 45°$ in order to remove the drilling dust. The deflecting surface 20 which runs toward the cutting edge 19 is designed at an inclined angle to limit the surface load on the cutting area. The drilling base is designated as 21.

Figure 2:
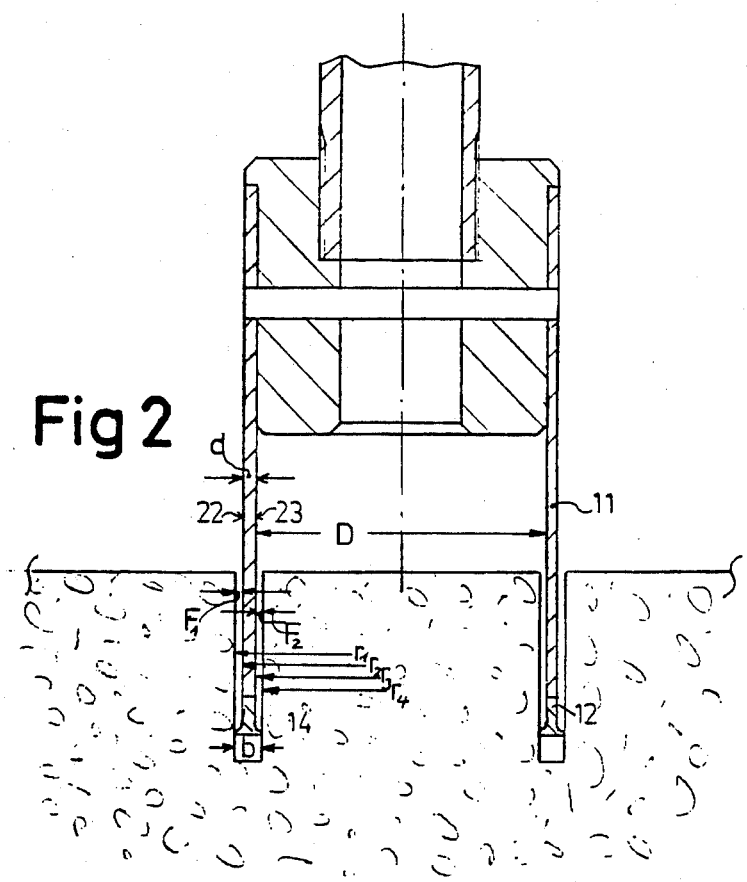
FIG. 2 shows a section of the drill tool when used in rock drilling.

FIG. 2 shows a section of the drill bit in drilling operation. The cylindrical bit body 11 shown in section has a thickness d of 1.2 to 1.5 mm, whereas the cutting width b of the PCD cutting element 14 is 3 mm. Provided the cutting element is exactly concentric with the wall of the cylindrical part, a gap of equal width develops at the outer jacket surface 22 and the inner jacket surface 23 of the bit body 11. The annular area $F_1$ formed by this gap at the outside because of the larger radius is in this case larger than the corresponding annular area $F_2$ at the inside of the jacket surface. According to the invention, however, the inner annular area $F_2$ is to be at least the same size or larger than the outer annular area $F_1$. At a diameter of the drill bit of D=65 mm, the area ratio can be $F_1:F_2=1:1$. At a diameter of the drill bit of, for example, 20 mm, the inner area $F_2$ is to be larger than the area $F_1$ by about 25%. This is achieved by an appropriate eccentric arrangement of the cutting elements 14.

FIG. 1 also shows the guide pins 24. These inserted, cylindrical pins made of carbide are used for lateral guidance, that is, they support the drill bit relative to the drill wall. Moreover, the guide pins limit the drilling feed by being arranged axially beneath the upper cutting edge 19 by an amount corresponding to the drilling feed. The guide pins are preferably arranged asymmetrically to prevent torsional vibrations.

Intermediate spaces 25 are provided between the PCD cutting elements for drawing off air and drilling dust. The intermediate spaces are preferably arranged in the area in front of the cutting elements to obtain a particularly high air flow in this area to increase the conveyance of drilling dust in front of the cutting edge. However, the intermediate spaces must not be too large, otherwise the drill bit will rotate unevenly in inhomogenous concrete and will therefore be subjected to increased wear. The correspondingly available guide webs 26 are therefore used for a more even run.

The upper lateral corners of the PCD cutting elements are preferably made as bevelled edges, otherwise an excessive surface load would lead here to an indefinite failure of these corner areas, which would have a negative effect on the cutting performance. The cutting edge profile can be designed in a roof shape or can be radiused.

The lower area of the bit body has L-shaped slots which act as a bayonet catch. The L-shaped slot engages in two diametrically arranged pins on a locating flange, the diameter of which is adapted to that of the drill bit. In this way, it is possible to remove the drill bit directly from the flange and thus remove the core, which is contained in the drill bit, by the smooth rear side of the drill bit. The drilled core can therefore be removed from the drill bit much more easily than previously, because it does not have to be removed at the cutting end face of the drill bit provided with projections.

The drill bit according to the invention also makes it possible to drill in reinforced material.

The invention is not of course limited to the illustrative embodiment explained. On the contrary, modifications are possible to the effect that the cutting elements, for example, are made of other suitable materials such as CBN (cubic boron nitride). Also, at lower load, individual cutting elements can be replaced or complemented by carbide teeth. If the cooling system is appropriately converted, water cooling can also be used.

We claim:

1. Drill bit for rotary application by an air-cooled, dry drilling method without auxiliary support said bit comprising: a thin-walled cylinder having a cutting end face; at least two heavy-duty, PCD cutting elements fastened to said cylinder at said cutting end face, each said cutting element comprising a carbide body and a synthetic polycrystalline diamond coating applied to said carbide body, wherein in the radial direction of said cylinder, each said cutting element has a width of about 2.5 to 4 mm and said thin-walled cylinder has a wall thickness of about 50% of the width of each said cutting element; and a plurality of guide elements secured to said cylinder and projecting axially from said cutting end face for limiting the drilling feed of said cutting elements, each said guide element being located between successive ones of said cutting elements and having a radial outer diameter substantially equal to that of each said cutting element.

2. Drill bit as defined in claim 1 wherein each said cutting element has a width of about 3 mm.

3. Drill bit as defined in claim 1 wherein said guide elements are distributed asymmetrically around the circumference of said cylinder 4. Drill bit as defined in claim 1 wherein said guide elements are made of carbide.

5. Drill bit as defined in claim 1 wherein said thin-walled cylinder has an outer radius, $r_2$, and an inner radius, $r_3$, the width of each said cutting element extends between an outer radial distance, $r_1$, and an inner radial distance, $r_4$, from the axis of said cylinder, and each said cutting element is radially positioned relative to said cylinder such that the area, $F_1$, of an annulus having an outer radius $r_1$ and an inner radius $r_2$ is less than the area, $F_2$, of an annulus having an outer radius $r_3$ and an inner radius $r_4$.

6. Drill bit as defined in claim 5 wherein $r_3$ is at least 20 mm and $F_2$ is 25% larger than $F_1$.

7. Drill bit as defined in claim 1 wherein each said cutting element has a relief angle $\alpha_1$ of 5° to 20° and a negative rake angle $\alpha_2$ of 5° to 20°.

8. Drill bit as defined in claim 7 wherein $\alpha_1$ is 12° and $\alpha_2$ is 12°.

9. Drill bit as defined in claim 1 wherein said thin-walled cylinder comprises a cylindrical body made of normal steel and a bit ring made of wear-resistant steel and brazed onto said cylindrical body, said bit ring having an axial end face defining said cutting end face of said cylinder and being provided with locating pockets extending axially from said cutting end face and in which said cutting elements are fastened, each said locating pocket having a widened back for supporting a respective cutting element, and wherein said guide elements are fastened in said bit ring.

10. Drill bit as defined in claim 9 wherein said cutting elements are fastened in said pockets by brazing to said bit ring.

11. Drill bit as defined in claim 9 wherein said cutting elements are fastened in said pockets by electron beam welding to said bit ring.

12. Drill bit as defined in claim 9 wherein said bit ring is made of carbide steel.

13. Drill bit as defined in claim 9 wherein said guide elements are guide pins fastened into said bit ring by brazing.

14. Drill bit as defined in claim 1 wherein said guide elements are guide pins fastened into said cylinder by brazing.

15. Drill bit as defined in claim 1 wherein said cylinder is provided, at said cutting end face, with a clearance space in front of each said cutting element for the removal of drilling dust.

16. Drill bit as defined in claim 1 wherein each said cutting element has a cutting edge and said cylinder is provided, at said cutting end face, with a deflecting surface in front of each cutting element running at a slightly rising angle toward the associated cutting edge.

17. Drill bit as defined in claim 1 wherein each said cutting element has a cutting surface with lateral edges which are bevelled or rounded.

18. Drill bit as defined in claim 1 wherein each said cutting element has a roof-shaped cutting surface.

19. Drill bit as defined in claim 1 wherein there are no more than five of said cutting elements fastened to said cylinder.

* * * * *